March 12, 1957     J. A. ROBINSON     2,785,378
ELECTRICAL MEASURING SYSTEM
Filed Jan. 30, 1953
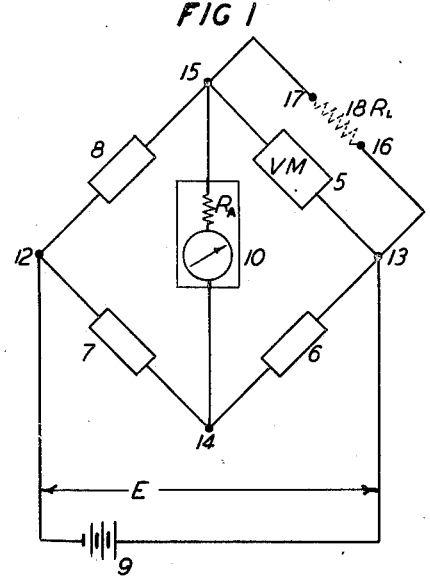
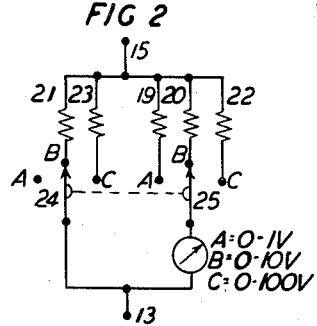
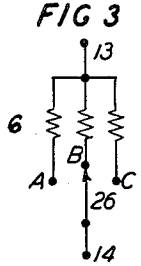
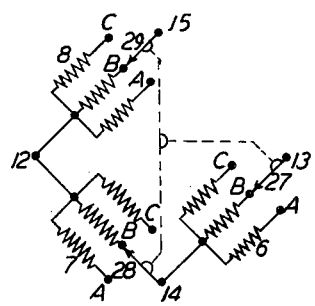
INVENTOR
J. A. ROBINSON
BY
ATTORNEY United States Patent Office 2,785,378
Patented Mar. 12, 1957

2,785,378

ELECTRICAL MEASURING SYSTEM

John A. Robinson, Ridgefield, N. J., assignor to Western Electric Company, Incorporated, New York, N. Y., a corporation of New York Application January 30, 1953, Serial No. 334,283

1 Claim. (Cl. 324—101)

This invention relates to electrical measurements and particularly to the measurement of the voltage-current characteristics of electrical circuits or apparatus.

Conventional circuits for making such measurements cannot give accurate indications of both the current through the load and the potential drop across it. In one well known type of circuit, the ammeter indicates the sum of the load and the voltmeter currents and in another, the voltmeter indicates the sum of the potential drops through the load and through the ammeter. In either case, a correction is necessary to obtain accurate results.

Proposals have been made heretofore for eliminating the error in the meter indications as for example by the use of a special ammeter having a second winding for balancing out the effects of the voltmeter current.

The object of this invention is a system in which standard meter movements may be used to give accurate load current and load voltage indications.

In accordance with an embodiment of the invention, the voltmeter and three fixed resistors form a bridge with the source of potential and the ammeter connected across the two diagonals, respectively. Two of the fixed resistances act as ammeter shunts and determine the current range of the circuit while the third resistance acts as a compensator for the voltmeter. The arms of the bridge are selected so that with no load connected to the circuit, the bridge is balanced and the ammeter indicates zero. When a load is connected across the voltmeter, the ammeter then indicates a current directly proportional to the true load current.

The range of voltage measurement may be extended by utilizing a multiple-range voltmeter and providing means for changing another impedance of the voltmeter arm such that the resultant impedance of the arm is the same for each range used; or a multiple-range voltmeter may be used for the voltmeter arm and means provided for changing the impedance of other arms of the bridge to correspond to the range of the voltmeter used.

A better understanding of the invention will be had from the following detailed description taken in conjunction with the accompanying drawing in which:

Fig. 1 is a circuit diagram of an embodiment of the present invention;

Fig. 2 is a schematic diagram of the voltmeter arm of the system of Fig. 1 wherein a multiple-range voltmeter is utilized;

Figs. 3 and 4 are schematic diagrams showing resistance switching arrangements for one and three resistance impedance arms respectively of the system of Fig. 1.

The system shown in Fig. 1 disclosed a voltmeter arm 5 and three resistance networks arms 6, 7 and 8 in a bridge circuit with a potential source 9 of "E" volts and an ammeter 10 connected across the diagonals 12—13 and 14—15, respectively. Test terminals 16 and 17 are connected to junctions 13 and 15, respectively, so that a load 18 having a resistance of $r_1$ ohms, whose voltage-current characteristics are to be measured, may be connected in parallel with the voltmeter arm of the bridge.

In a simplified embodiment of the invention, the networks 6, 7 and 8 are fixed resistance elements of $r$, $r_b$ and $r_c$ ohms respectively, and the voltmeter arm 5 is a conventional single range meter of resistance $r_v$. The series resistance of the ammeter is $r_a$ ohms.

In setting the bridge up for operation, the test terminals 16 and 17 are open circuited and the bridge is balanced by selecting impedance arms such that the ammeter current $i_a$ is zero. Then, the ratio of the resistance arms will be $$\frac{r_b}{r_c} = \frac{r}{r_v} \tag{1}$$

$r_b$ and $r_c$, the ammeter shunt resistances, must be in the ratio as determined by Equation 1 but may have different numerical values according to the ammeter range desired.

When the bridge is balanced as described above, the ammeter indication is compensated for the current drawn by the voltmeter 5 and when a load 18 is connected across the test terminals 16 and 17, the ammeter will indicate a current $i_1$ directly proportional to the current through the load $r_1$. The factor by which the ammeter current $i_a$ must be multiplied to give this true load current $i_1$ is known as the scale factor "$n$."

A mathematical expression for "$n$" in terms of the bridge resistances, as well as an equation defining the required relationship between the bridge circuit components and "$n$," are derived below.

The current $i_a$, through the ammeter, when the load $r_1$ is connected to the test terminals is $$i_a = E \frac{rr_c\left(\frac{r_v}{r_v+r_l}\right)}{D} \tag{2}$$

and the current in the load is $$i_l = E \frac{[r_a(r_b+r)+r(r_b+r_c)]\left(\frac{r_v}{r_v+r_l}\right)}{D} \tag{3}$$

where $D = (r_b+r)r_cr_v + (r_c+r_v)r_br +$
$(r_br_v+rr_c)r_a + (r_br_c+rr_v)r_a$ by dividing Equation 3 by Equation 2, $$\frac{i_l}{i_a} = \frac{r_a(r_b+r)+r(r_b+r_c)}{rr_c} \tag{4}$$

All the terms on the right hand side of Equation 4 are constants and since by definition "$n$" is equal to the load current divided by the ammeter current, the scale factor "$n$" is found from Equation 4 by substituting "$n$" for $$\frac{i_l}{i_a}$$

$$n = \frac{r_a(r_b+r)+r(r_b+r_c)}{rr_c} \tag{5}$$

The true load current then is found by multiplying the ammeter current by the constant as found by Equation 5. It is, of course, possible to calibrate the ammeter scale to read load current directly for any fixed bridge circuit.

Equation 1 defines the required relationship between the four arms of the bridge circuit, and by solving Equation 1 for $r$, the voltmeter compensating resistance, it is found that $$r = r_v\frac{r_b}{r_c} \tag{6}$$

and from Equation 4

$$r = \frac{r_ar_b}{r_c(n-1)-(r_a+r_b)} \tag{7}$$

then substituting $$r_v\frac{r_b}{r_c}$$

from Equation 6 for "$r$" in Equation 7

$$r_v = \frac{r_a r_c}{r_c(n-1)-(r_a+r_b)} \tag{8}$$

Therefore, in order to achieve the proper compensating performance, the relationships, as defined by Equations 1 and 8, must exist.

Fig. 2 shows the voltmeter arm 5 of the bridge of Fig. 1 wherein a multiple-range meter is used without requiring a change in the other bridge balancing resistances for each range of the meter. This is done by shunting appropriate resistances across the voltmeter at higher voltage ranges to give a constant value for the combined resistance of the voltmeter and the voltmeter shunt. For instance, the bridge of Fig. 1 may be initially set up with the one volt voltmeter arm of position A of the ganged switches 24 and 25. Here the resistance of the bridge arm between terminals 13 and 15 is equal to the resistance of the series voltmeter resistor 19 which, for purposes of illustration, will be taken as 1000 ohms. In switch position B, the 10 volt range of the voltmeter, the series resistor 20 of the voltmeter is 10,000 ohms and since the resistance across terminals 13 and 15 must be equal to 1000 ohms as in position A, a 1111 ohm voltmeter arm equalizing resistor 21 is shunted across terminals 13 and 15. Likewise, for the 100 volt range of Fig. 2 where the series voltmeter resistor 22 is 100,000 ohms, a 1010 ohm equalizing resistor 23 is shunted across terminals 13 and 15.

Instead of utilizing voltmeter shunting resistances as discussed above, the voltmeter arm 5 may comprise a multiple-range voltmeter and, for each of the ranges of the voltmeter, a corresponding bridge balancing resistance element may be provided in one of the other arms. In Fig. 3 bridge arm 6 is provided with a switch 26 for changing the resistance of the arm to correspond to the voltmeter range selected. In this system the ammeter scale factor "$n$" will vary for each range of the voltmeter and may be determined from Equation 5.

To avoid changing the scale factor "$n$" for each range of the voltmeter, a switching arrangement as shown in Fig. 4 may be employed. In this system the resistance network arms 6, 7 and 8 are provided with ganged switches 27, 28 and 29, respectively, for changing the bridge balancing resistances to correspond to the voltmeter range selected. Knowing "$r_v$" and "$n$" for each range of the voltmeter, Equations 7 and 8 may be used to determine the values of the resistances of the other arms of the bridge.

It is to be understood that the above described arrangements are simple illustrative of the application of the principles of the invention. Numerous other arrangements may be readily devised by those skilled in the art which will embody the principles of the invention and fall within the spirit and scope thereof.

What is claimed is:

A system for accurately measuring the voltage-current characteristics of a load comprising an arm including a multiple-range voltmeter and three resistance arms serially connected together as a balanced bridge, an ammeter connected across one diagonal of the bridge, a source of potential connected across the other diagonal, terminals for connecting electrical loads across the voltmeter arm, voltmeter compensating resistances for each of the multiple-ranges of the voltmeter, said compensating resistances comprising sets of resistors for each of the three resistance arms having impedances corresponding to each of the ranges of the voltmeter, and switching means for selectively connecting into the bridge corresponding resistors from each set for each of the multiple ranges of the voltmeter.

References Cited in the file of this patent

UNITED STATES PATENTS

| | | |
|---|---|---|
| 1,901,343 | Eastham | Mar. 14, 1933 |
| 2,424,596 | Webber | July 29, 1947 |
| 2,463,436 | Sorvaag | Mar. 1, 1949 |
| 2,481,589 | Hansell | Sept. 13, 1949 |
| 2,495,752 | Montgomery | Jan. 31, 1950 |